340-870.15 SR

OR 2,586,427

Feb. 19, 1952 W. A. HAGENAU 2,586,427

TELEMETRIC APPARATUS

Filed Oct. 29, 1948 2 SHEETS—SHEET 1

INVENTOR.
WALTER A. HAGENAU

BY E. C. Sanborn

ATTORNEY.

Feb. 19, 1952 W. A. HAGENAU 2,586,427

TELEMETRIC APPARATUS

Filed Oct. 29, 1948 2 SHEETS—SHEET 2

*INVENTOR.*
WALTER A. HAGENAU

*BY* E. C. Sanborn

ATTORNEY.

Patented Feb. 19, 1952 2,586,427

UNITED STATES PATENT OFFICE 2,586,427

TELEMETRIC APPARATUS

Walter A. Hagenau, Providence, R. I., assignor to Builders Iron Foundry, Providence, R. I., a corporation of Rhode Island Application October 29, 1948, Serial No. 57,269

10 Claims. (Cl. 177—351)

Figure 1A:
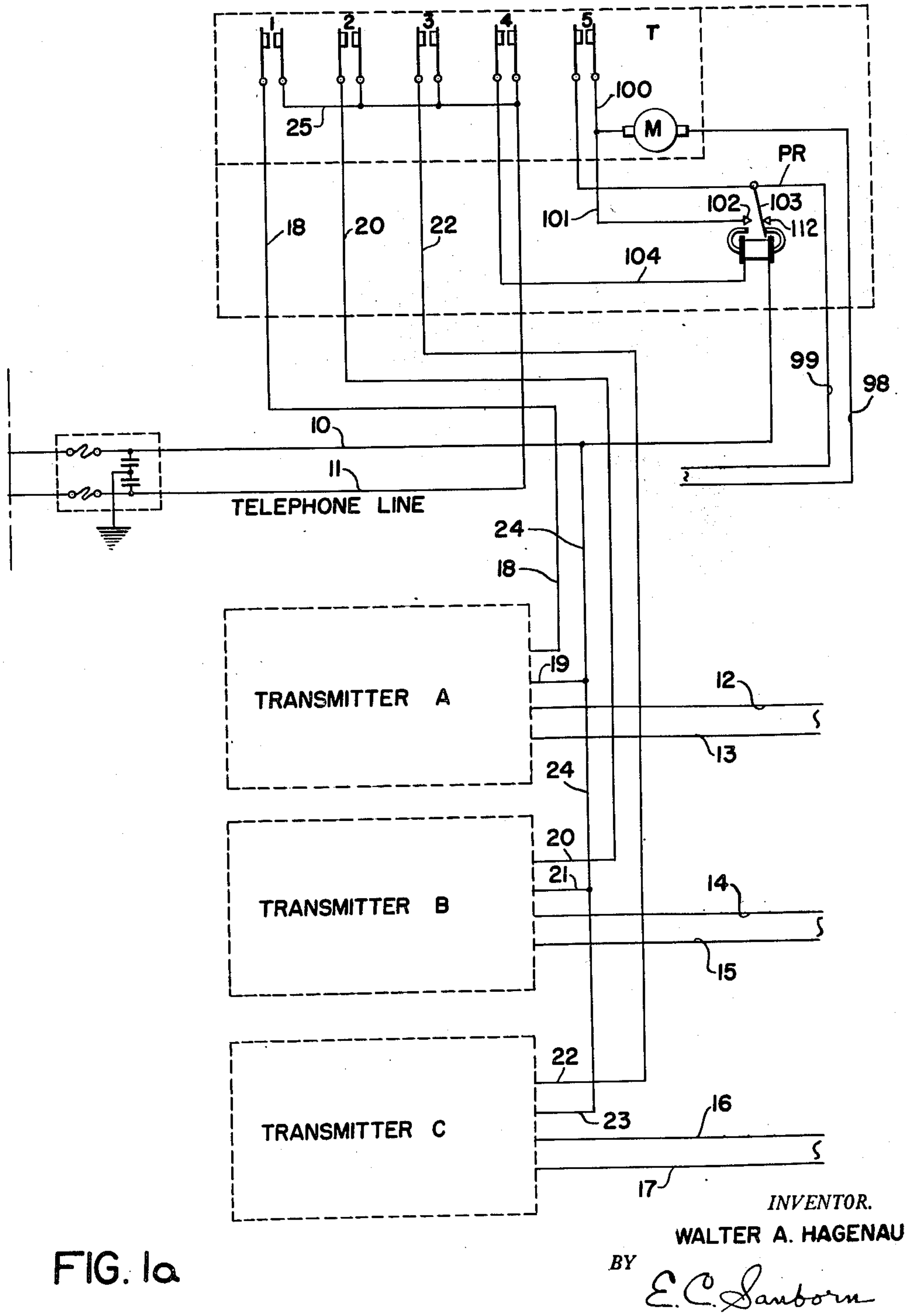

This invention relates to telemetering, and more particularly to the transmission over a single channel of the values of a plurality of variable magnitudes. The invention provides novel and effective means, of simple and economical construction, for connecting to a telemetering channel a plurality of telemetric transmitters and receivers in predetermined sequence, so that each of the plurality of transmitters may send values of the variable magnitude to which it responds, to an associated receiver.

The invention further provides for the efficient sequential coordination of transmitters and receivers of the "impulse-duration" type, preserving the advantages of that system of telemetering while enabling values of a plurality of different variables to be transmitted in sequence to different receiving instruments at a distant station or stations.

A further feature of the invention comprises timing means at the respective stations, coordinated with the transmitters and receivers, together with synchronizing means at one station brought into action at predetermined intervals by the timing means at the other station.

In carrying out the invention in the preferred embodiment illustrated in the accompanying drawings, I provide for sequentially connecting a plurality of "impulse-duration" transmitters to a single signal channel by a timer driven by a motor at substantially constant speed and having contacts connecting the impulse-producing elements of the transmitters successively to said channel for transmitting signal impulses of durations proportional to the respective variables (such as rate of flow, level, and temperature of a liquid) controlling the respective transmitters. At the receiving station a timer operated by a motor at substantially constant speed actuates contacts connecting receivers of the "impulse-duration" type to said signal channel successively for operation during the periods of connection of the corresponding transmitters to said channel. More specifically, in the embodiment illustrated, I provide for connecting the motor of each receiver through said timer to a power source at the receiving station and concurrently connecting a clutch-control relay in said receiver through said timer to a contact of a signal-receiving relay, for a period during which the corresponding transmitter is connected to said signal channel.

When any transmiter connected to the signal channel sends a signal impulse, the latter energizes the aforementioned signal-receiving relay at the receiving station, for the duration of said impulse. The operation of said signal-receiving relay closes a circuit through the clutch-control relay of that receiver whose motor is energized through the motor driven timer at the receiving station, and establishes the "increase clutch" of said receiver for the duration of the signal. Upon termination of the signal, the clutch-control relay of said receiver is de-energized, and the "decrease" clutch of the receiver is established for the remainder of the transmitter signalling-cycle.

A more specific and advantageous feature in the embodiment disclosed is that the sequencing contacts of the timers are set so that the receiver "on" periods are shorter than and centered in the transmitter "on" periods. Thus slight errors in synchronization will still permit the receiver "on" periods to fall within those of the transmitters.

Another specific feature included in the embodiment here disclosed is provision for automatic synchronization of the timers at the start of each period or revolution by a reverse polarity impulse. In this embodiment, the receiving unit timer may, for example, have a period of 306 seconds and revolve continuously. The transmitter unit timer may have a shorter period, 300 seconds, for example, and stop at the end of each revolution because its drive motor current is obtained through one of its own contacts which opens at the end of each revolution. Shortly before such stopping of the transmitter timer, another contact energizes a polarized relay in a direction to shift its movable contact into engagement with a dead contact or stop. As the receiver unit timer completes its cycle, one of its contacts energizes a synchronizing relay which reverses power connections to the signal line, sending over the line an impulse of reversed polarity, and energizing the polarized relay in the transmitter unit so that its movable contact leaves engagement with the aforesaid dead contact and makes engagement with a contact in another power connection to the transmitter timer motor. The reverse polarity, or synchronizing, signal is maintained for a sufficient time to allow the transmitter-timer power contact to again close. The receiver timer contact which energized the synchronizing relay then opens, terminating the reverse polarity signal and leaving the transmitter-unit timer to continue its cycle unassisted. Thus, as the receiver unit starts on a new cycle or period the transmitter unit also starts a new period.

A further specific feature included in my illustrative embodiment is that the aforementioned contact of the receiver timer which energizes the synchronizing relay is adapted also to energize concurrently certain auxiliary relays. These relays energize all the receiver clutch-control relays which in turn energize the "up" clutches of the receiver mechanisms. At the end of the synchronizing period the auxiliary and signal relays return to normal and the down clutches again become energized. This actuation of the clutch mechanisms does not affect the readings of the various receivers because their drive motors are not running. Said receiver motors are controlled only by other timer contacts which are then open. However, this actuation of the receiver clutches insures the return of the clutch armatures to zero for the start of the next sequencing period.

Other features and advantages of the invention will be hereinafter described and claimed.

In the accompanying drawings:

Fig. 1*a* is a diagrammatic view illustrating an embodiment of apparatus at a transmitting station arranged in accordance with the invention.

Figure 1B:
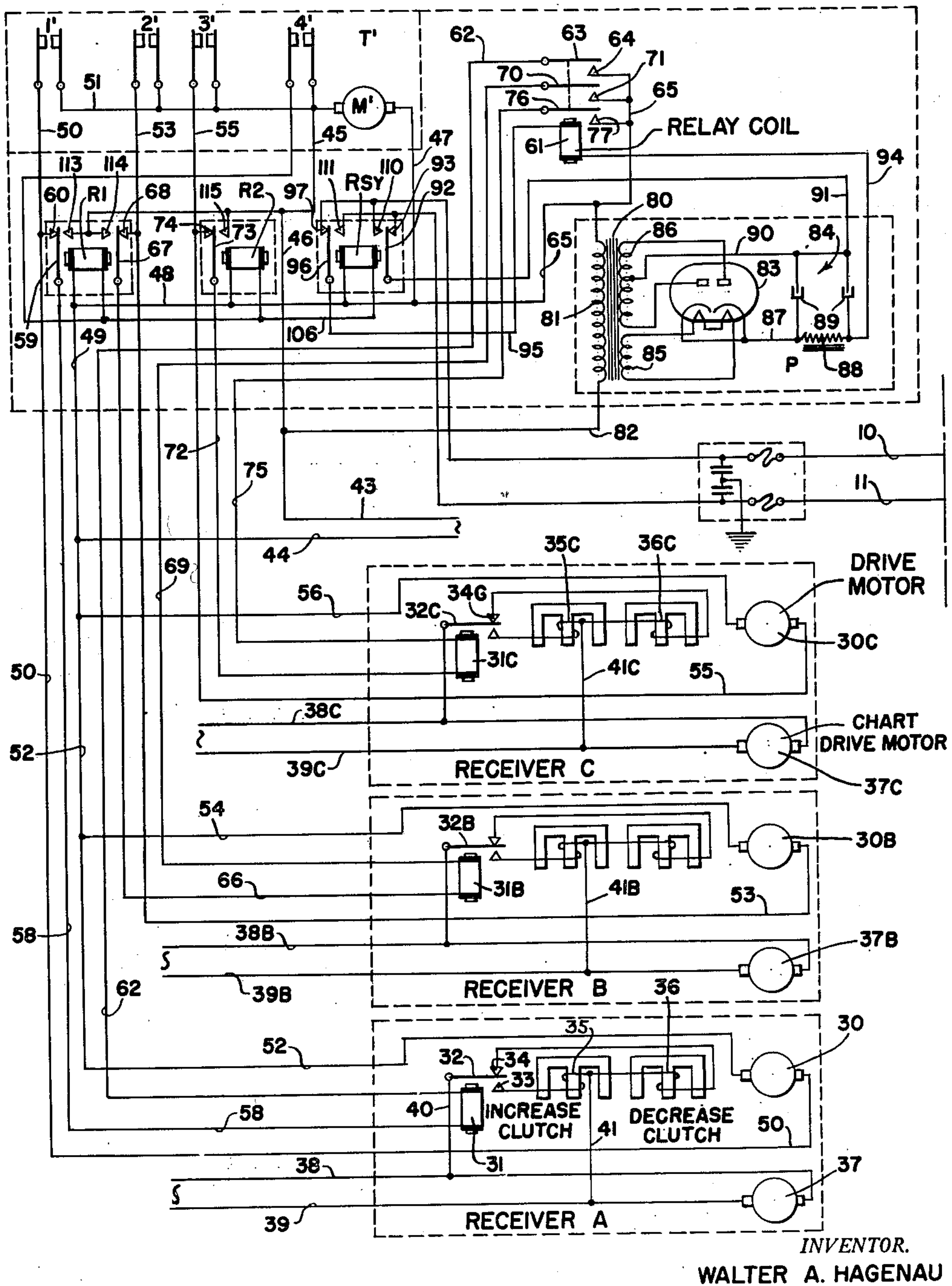

Fig. 1*b* is a similar view illustrating an arrangement at the receiving station embodying the invention.

Referring to the drawings, there is shown a two-wire signalling line, comprising conductors 10, 11, which may, for example, be a standard telephone line. At the transmitting station there are shown a plurality of transmitters designated as A, B and C, respectively, in Fig. 1*a*. These transmitters are of conventional type for sending, in each of a succession of uniform time cycles, an electrical impulse of a duration corresponding to the value of a measured magnitude. For instance, said transmitters may be of the construction shown in the Thoresen Patent No. 2,111,679, issued March 22, 1938, or of the construction embodied in the transmitters marketed by applicant's assignee under the trade-mark "Chronoflo," which are well-known in the art and have been illustrated and described in various publications (for example, in Principles and Methods of Telemetering, by Borden and Thynell, published in 1948 by Reinhold Publishing Company, p. 105, and Builders Iron Foundry Bulletin No. 298, published in 1938). Each of said transmitters, as is well understood in the art, comprises a constant speed motor which receives current from a suitable power supply line, such as indicated by conductors 12, 13 for transmitter A, conductors 14, 15 for transmitter B, and conductors 16 and 17 for transmitter C. These lines may, of course, be supplied with electrical energy, such as alternating current of commercial frequency, from a common source. In each "Chronoflo" transmitter the motor rotates at constant speed a cam or "scroll plate," which cooperates with an arm that is positioned in accordance with the value of the variable under measurement. In each cycle of rotation of the cam the latter operates, through said arm, a rocker bar to which is attached a permanent magnet, which attracts a contact of a mercury switch for a duration in the cycle corresponding to the value of the variable. An impulse of such duration is thus transmitted in each of said cycles.

In Fig. 1*a*, the contacts of the mercury switch of transmitter A are connected to conductors 18, 19, respectively; while those of the switch of transmitter B are connected to conductors 20, 21, and the switch contacts of transmitter C are connected to conductors 22, 23. Conductors 19, 21 and 23 are shown connected to a common conductor 24 which in turn is connected to conductor 10 of the telephone line.

It will, of course, be understood that three transmitters are shown simply by way of examples to illustrate the mode of operation of the invention, and that the number of transmitters may be varied as desired.

At the transmitting station there is provided a timing apparatus designated T, which may be of well-known standard or conventional form comprising a constant-speed motor M and a plurality of pairs of contacts operated in predetermined sequence by the motor through any suitable means such as cam mechanism. In the embodiment illustrated, five pairs of contacts are shown designated 1, 2, 3, 4 and 5, respectively. One of the contacts of the pair 1 is connected to the conductor 18 of transmitter A, while the other of said contacts 1 is connected by wire 25 to the conductor 11 of the telephone line or other signalling channel. Similarly, one of the contacts of the pair 2 is connected to wire 20 of transmitter B; while one of the contacts of the pair 3 is connected to wire 22 of transmitter C. The other contacts of the pairs Nos. 2 and 3 are, as shown, connected to wire 25.

As the timer motor M rotates, the contacts of pair 1 are first closed for a predetermined period, thus connecting the transmitter A to the telephone line for that period. During this time the transmitter sends over the telephone line 10, 11 one or more electrical impulses of durations corresponding to the values of the variable to which the transmitter responds. The number of impulses sent during this period depends upon the number of cycles of rotation of the motor-operated cam of the transmitter during the period of closure of the timer contacts 1. After the lapse of said predetermined period, the timer contacts 1 are opened and contacts 2 are closed, thus connecting transmitter B to the line for a predetermined time, during which transmitter B sends over the telephone line one or more electrical impulses of duration corresponding to the values of the variable to which transmitter B responds. At the expiration of the period of time during which contacts 2 are closed, those contacts are opened by the timer motor and contacts 3 are closed for a predetermined interval, thus connecting transmitter C to the telephone line for that interval, during which transmitter C sends over the telephone line one or more electrical impulses of durations corresponding to values of the variable to which that transmitter responds.

As an example, the impulses sent from transmitter A may correspond to the level of the water in a reservoir, those sent by transmitter B to the rate of flow of water from the reservoir, and those sent by transmitter C to the temperature of the water in the reservoir.

At the receiving station (Fig. 1*b*) there are provided three receiver units, designated A, B, and C, of well-known type for responding to the signal impulses from the respective transmitters. These receivers may be of the type illustrated in the Huxford Patent No. 2,145,026, issued January 24, 1939, and marketed by applicant's assignee under the trade-mark "Chronoflo" (said receivers being also illustrated in the book and bulletin previously referred to). Each receiver comprises a constant speed motor, which, through gearing

SEARCH ROOM continuously rotates two electromagnetic clutch members in opposite directions. When an impulse is received from the corresponding transmitter, a relay at the receiver is energized and its armature engages a contact, closing a circuit through the winding of the "increase" clutch; which thereupon connects a positioning finger to the rotating member of that clutch. If, during the impulse, said positioning finger strikes the receiver pen arm or indicator, it shifts the latter to a new position corresponding to the value transmitted by the impulse. When the impulse ceases, the relay is deenergized and its armature engages another contact, closing a circuit through the winding of the "decrease" clutch. Thereupon, another positioning finger is connected to the rotating member of the "decrease" clutch, and said finger moves in the opposite direction to that of the first mentioned finger, for the portion of the transmitter signalling cycle in which no impulse is sent. If the receiver pen arm or indicator is at a higher value than that represented by the transmitted impulse, the finger operated by said "decrease" clutch engages said pen arm or indicator and shifts it to a position corresponding to the new value. Each receiver also comprises a constant-speed motor continuously connected across suitable power lines for driving continuously a chart for cooperation with the pen arm.

The constant-speed motor for rotating the aforementioned clutch members in the receiver A in Fig. 1b is designated 30, and the relay is designated 31. When said relay is energized, its armature 32 engages a contact 33, closing a circuit through the "increase" clutch winding 35, as will be hereinafter noted more particularly. When said relay is deenergized, its armature engages a contact 34, closing a circuit through the "decrease" clutch winding 36. The chart-drive motor 37 in receiver A is shown at 37, connected continuously across suitable supply wires 38, 39.

The relay contact 33 is connected to one terminal of the clutch winding 35, which at its opposite terminal is connected to a terminal of the clutch winding 36; the other terminal of the last mentioned winding being connected to the relay contact 34. The armature 32 is connected by wire 40 to supply wire 38, while the two clutch windings 35 and 36 are connected to the other supply wire 39 by a wire 41.

The motors, relay, clutch windings, and other connections in receiver B corresponding to the parts above described in receiver A are designated by the same reference numerals with the letter B added. Likewise, the corresponding parts in receiver C are designated by the same reference numerals with the addition of the letter C. It will, of course, be understood that the supply wires 38—39, 38B—39B, and 38C—39C of the respective receiver units A, B, and C, may receive electrical energy either from separate sources or from a common source.

Timing apparatus of conventional type, designated T′ is provided at the receiving station, said apparatus, like that at the transmitting station, comprising a constant-speed motor M′ and contacts operated thereby in predetermined sequence. The motor M′ of the receiving station timer is continuously connected across supply wires 43, 44, which may receive electrical energy from a separate source, or, if desired, from a source common to the various supply lines 38—39, 38B—39B, 38C—39C, and 43—44. For example, all of said supply lines may receive alternating current of commercial frequency from a common source. One terminal of the motor M′ is connected through wires 45 and 46 with supply wire 43, while the other terminal of said motor is connected to supply wire 44 by wires 47, 48, and 49. Thus said timer motor rotates continuously.

The clutch-operating motor 30 of receiver A has one terminal connected through wire 50 to one of a pair of contacts 1′ of the timer T′, the other of which contacts is connected by wire 51 to wire 45 and thence to the supply wire 43. The other terminal of said motor 30 is connected through wire 52 to the supply wire 44. Thus, whenever the timer contacts 1′ are closed by the timer motor, the motor 30 of receiver A is energized, and remains in operation for the duration of closure of said contacts.

Similarly, the clutch-operating motor 30B of receiver B has one terminal connected by wire 53 to one of the pair of contacts 2′, the other of which contacts is connected to the aforementioned wire 51. The other terminal of motor 30B is connected by wire 54 to wire 52. Hence, when timer contacts 2′ are closed by the timer motor, the motor 30B is energized for the duration of closure of those contacts.

Likewise, one terminal of motor 30C of receiver C is connected by wire 55 with one of the pair of timer contacts 3′, the other of which contacts is connected to the previously mentioned wire 51. The other terminal of motor 30C is connected by wire 56 with the aforementioned wire 52. Thus, whenever the contacts 3′ are closed by the timer motor, the motor 30C of receiver C is energized for the period during which those contacts are closed.

One terminal of the relay 31 of receiver A is connected by a wire 58 with an armature 59 of a relay R1, which armature normally engages a contact 60 of said relay. Through said armature and contact, said wire 58 is connected to the wire 50 and thus to one of the pair of timer contacts 1′. Thus, whenever said contacts 1′ are closed, said wire 58 is connected to the supply wire 43. Relay 31, however, will not be energized unless another relay, shown at 61 is energized. To that end, the other terminal of relay 31 is connected by wire 62 to a movable contact or armature 63 of said relay 61, which, when relay 61 is energized, engages a contact 64. The latter is connected by wire 65 to wire 48, and thus to supply wire 44. Relay 61 is energized whenever an impulse is received over the telephone line 10, 11, as will presently be noted more particularly.

One terminal of relay 31B of receiver B is connected through wire 66 to a movable contact or armature 67 of relay R1, which normally engages a contact 68 connected through wire 53 to one of the timer contacts 2′. The other terminal of relay 31B is connected through wire 69 to a movable contact or armature 70 of relay 61. When the latter is energized its contact 70 engages contact 71 which is connected to wire 65.

A terminal of relay 31C of receiver C is connected by wire 72 to movable contact or armature 73 of a relay R2 which normally engages a contact 74 connected through wire 55 with one of the timer contacts 3′. The other terminal of said relay 31C is connected by wire 75 with movable contact or armature 76 of relay 61. When relay 61 is energized it engages contact 76 with a contact 77 connected to said wire 65. The movable contacts 63, 70, and 76 of relay 61 are mechanically connected to move in unison so that when said relay 61 is energized they will engage simultaneously the respective contacts 64, 71, and 77, and will be disengaged simultaneously from said contacts when relay 61 is de-energized.

Power for the signalling impulses in the signal channel or telephone line 10, 11 may be supplied in any convenient manner. At P in Fig. 1*b*, I have shown a power-rectifier apparatus of well-known type for deriving direct current from a source of alternating current, through which apparatus I apply direct current to the channel 10, 11 at the receiving station. The apparatus P comprises a transformer 80, the primary winding 81 of which is shown connected at one end through wire 82 to the wire 43 of the alternating current supply line 43, 44. The other end of said primary winding 81 is connected to the wire 65 and thus, through wire 49, to the wire 44 of said alternating current supply. The apparatus P also comprises a double plate rectifier tube 83 and a filter 84. Current for heating the cathodes of the tube 83 is provided by a secondary winding 85. The other secondary winding 86 has opposite terminals connected to the plates or anodes of said tube 83. The cathodes are connected by wire 87 with the filter 84 which comprises choke coil 88 and condensers 89. An intermediate point on the secondary 86 is connected by a wire 90 with said condensers and with a wire 91 which in turn is connected to a movable contact or armature 92 of a relay R*sy*. Said armature normally engages a contact 93 which is connected to wire 11 of the signalling channel or telephone line. A wire 94 is connected to the choke coil 88 of filter 84 and a terminal of the relay 61, the opposite terminal of which relay is connected by a wire 95 with another armature or movable contact 96 of said relay R*sy*. Said armature 96 normally engages a contact 97 which is connected to the wire 10 of the signalling channel or telephone line.

When the switch contacts of any of the transmitters A, B or C are closed, current can flow from the power rectifier apparatus P through the relay 61. For instance let it be assumed that the contacts 1 of the timer T at the transmitting station are closed and that the switch contacts of transmitter A connected to wires 18 and 19 are closed. Direct current can now flow from the rectifier arrangement P at the receiving station through wire 94, relay 61, wire 95, contacts 96 and 97 of relay R*sy*, and wire 10 of the signalling channel to wires 24 and 19 at the transmitting station; and thence through the closed switch contacts of transmitter A, wire 18, the closed contacts 1 of timer T at the transmitting station, wire 25, wire 11 of the signalling channel, contacts 93 and 92 of relay R*sy* at the receiving station, and wire 91 connected to said rectifier arrangement P. Similarly, when the switch contacts of transmitter B are closed during closure of contacts 2 of timer T at the transmitting station, direct current flows through relay 61 over the wires 10 and 11 from the rectifier arrangement P as long as said transmitter switch contacts remain closed. The same is true whenever the switch contacts of transmitter C are closed during closure of the contacts 3 of the timer at the transmitter station. In short, whenever the contacts of any of the transmitters is closed while the corresponding timer contacts are closed at the transmitting station, relay 61 at the receiving station is energized for the duration of closure of the transmitter switch contacts.

The motor M of the timer T at the transmitting station is supplied with power from wires 98, 99 which may receive electrical energy, such as alternating current of commercial frequency, from any suitable source. Said source may, if desired, be common to said wires 98, 99 and to the wires 12—17 which supply current to the transmitter motors.

As shown in Fig. 1*a*, one terminal of motor M is connected to wire 98, and the other terminal of said motor is connected, through a wire 100, to one of a pair of contacts 5 of the timer T, the other one of which contacts is connected to the wire 99. The last mentioned motor terminal is also connected through wire 101 to a stationary contact 102 of a polarized relay PR, having a movable contact 103 connected to wire 99.

One terminal of said polarized relay PR is connected through a wire 104 to one of a pair of contacts 4 of the timer T, the other of which contacts is connected to wire 11 of the signalling channel. The opposite terminal of said relay PR is connected to wire 10 of said channel. Thus, said polarized relay is connected across the wires 10, 11 whenever the contacts 4 of timer T are closed.

The relay R*sy* at the receiving station has one terminal connected to a wire 106, which, in turn, is connected to one of a pair of contacts 4′ driven by the timer motor M′. The other of said contacts 4′ is connected by wire 45 to the supply wire 43. The opposite terminal of said relay R*sy* is connected through wires 48 and 49 to the supply wire 44. Thus, whenever the timer contacts 4′ are closed, the relay R*sy* is energized.

The relays R1 and R2 each have one terminal connected to the aforementioned wire 106 and the opposite terminal to wire 49, wherefore closure of said timer contacts 4′ energizes these relays concurrently with relay R*sy*.

As previously noted, the motor M′ of the receiver timer T′ operates continuously. Motor M of the transmitter timer T, however, stops at the end of a predetermined time, when its contacts 5 are opened, and does not resume operation until the polarized relay PR is energized to engage its movable contact 103 with contact 102.

By way of an illustrative example, let it be assumed that the cycle of operation of the transmitter timer T is five minutes, or 300 seconds; and that the cycle of operation of the receiver timer T′ is 306 seconds. In operation, the sequencing contacts 1, 2, 3, 4, and 5 of the timer T are operated in predetermined sequence; the respective transmitters A, B, and C being successively thrown on the signalling channel or telephone line 10, 11, and removed therefrom, as previously noted, during the successive closures and openings of the respective contacts 1, 2, and 3. For instance, contacts 1 may be closed at 10 seconds after the start of the cycle and broken at 105 seconds after said start of the cycle; contacts 2 may be closed at 105 seconds and broken at 200 seconds after the start of the cycle; and contacts 3 may be closed at 200 seconds and broken at 295 seconds after the start of the cycle, so that each of the transmitters is on the line for 95 seconds. During the 95 seconds that a transmitter is on the line, it sends as many impulses (due to closing of its switch contacts) as there are cycles of rotation of its cam. That is, each transmitter sends one impulse for each rotation of the cam, the impulse being of a duration corresponding to the value of the variable to which the transmitter responds. If, for instance, the transmitter cam makes one revolution in 15 seconds, it will send six impulses during the time that it is on the line 10, 11.

Meanwhile, the receiver timer contacts 1′, 2′, 3′, and 4′ are closed in sequence, connecting the respective receivers A, B, and C in sequence to the line 10, 11 to receive impulses from the respective transmitters. Preferably, the mechanism of the timer T′ is set so that the periods of closure, of the respective contacts 1′, 2′, and 3′ are shorter than and centered in the periods of closure of the corresponding contacts 1, 2 and 3 of the transmitter timer T. Thus, in the example under consideration, the contacts 1′ of timer T′ may be closed 15 seconds after the start of the timing cycle and opened at 100 seconds after said start; the contacts 2′ may be closed at 110 seconds and opened at 195 seconds after said start; and the contacts 3′ may be closed at 205 seconds and opened at 290 seconds after said start. Thus, in such example, each receiver will be on the line for a period of 85 seconds within the 95 seconds during which the corresponding transmitter is connected to the line; the connection of the receiver being made five seconds after the transmitter is thrown on the line, and broken five sec- in such example, each receiver will be on the line Thus, any slight discrepancies in synchronization will still permit the periods of operation of the receivers to fall within those of the transmitters.

As previously observed, the closure of the timer contacts 1′, 2′ or 3′ connects the corresponding receiver clutch-operating motor 30, 30B, or 30C to the power line 43, 44.

Each impulse created by a transmitter in the line 10, 11 energizes the relay 61 at the receiving station, with resultant engagement of contacts 63, 70, and 76 with the respective contacts 64, 71, and 77, for the duration of said impulse. Thereby the relay 31, 31B, or 31C of the receiver corresponding to the transmitter on the signal line 10, 11, is energized from power line 43, 44, for the duration of said impulse, closing a circuit through the winding of the "increase" clutch of said receiver for said duration. Since the receiver clutch-operating motor 30, 30A, or 30B is energized throughout the closure of the respective timer contacts 1′, 2′, or 3′ aforementioned, the "increase" clutch of the receiver on the line actuates the positioning mechanism of said receiver in the "up" or "increase" direction for the duration of the impulse. When said impulse ceases, the relay 61 is deenergized, with consequent disengagement of its contacts 63, 70, and 76 from contacts 64, 71, and 77, and deenergization of the previously energized receiver relay 31, 31B, or 31C. The "decrease" clutch of the receiver on the line is now operated by the clutch-operating motor of said receiver, actuating the positioning mechanism of that receiver in the "down" or "decrease" direction for the remainder of the signalling cycle, until the next impulse from the transmitter is received. It will, of course, be understood that only the receiver whose clutch-operating motor and relay are connected through contacts of timer T′ to the power line 43, 44, is affected by the signalling impulse in lines 10, 11.

Upon opening of the contacts 3 in the transmitter timer T, the contacts 4 are closed. In the illustrative example under discussion, this takes place 295 seconds after the start of the cycle. Closure of said contacts 4, as previously noted, connects the polarized relay PR at the transmitting station to the signal line 10, 11. A circuit through said relay is now closed as follows: from wire 94 of the rectifier unit P at the receiving station through wire 95, contacts 96 and 97 of relay R*sy*, wire 10 of the signal line, polarized relay PR, wire 104, contacts 4 of timer T, wire 11, contacts 92 and 93 of relay R*sy*, and wire 91 to said rectifier unit. The current flowing in this circuit is of such polarity as to operate the relay PR to disengage its movable contact 103 from contact 102 and engage said movable contact with a suitable stop 112, which has no electrical connection. So long as the said contact 103 is in this position current cannot flow to the motor M by way of that contact. At this time, however, current continues to flow to motor M through the timer contacts 5, which were closed at an early point in the cycle (for instance, five seconds after the start of the cycle).

Said timer contacts 5 remain closed until the end of the cycle (300 seconds after the start of the cycle in the present example), when they are opened by the timer mechanism. The motor M is thereby deenergized and the timer T stops.

However, the motor M′ in the receiver timer T′ continues operating. At the end of the cycle of operation of timer T′ (306 seconds in this example), the contacts 4′ of said timer are closed, with consequent energization of relays R*sy*, R1, and R2.

Energization of relay R*sy* disengages its movable contacts 92 and 96 from contacts 93 and 97, and engages said movable contacts with contacts 110 and 111, respectively. Contact 110 is connected to wire 10 of the signal line, and contact 111 to wire 11. As previously observed, the movable contact 96 is connected to wire 94 of the rectifier unit P, while movable contact 92 is connected to wire 91 of said unit. Since the contacts 4 of the transmitter timer T were previously closed (at the end of 295 seconds) and have not yet been opened, current can now flow from unit P through wires 94 and 95, contacts 96 and 111 of relay R*sy*, wire 11, contacts 4 of timer T, wire 104, polarized relay PR, wire 10, contacts 110 and 92 of relay R*sy*, and wire 91 to the unit P. This current is of proper polarity for operating the polarized relay PR to shift its contact 103 from the stop 112 into engagement with contact 102. The motor M of timer T, which had stopped at the end of 300 seconds, is now energized by way of wires 98 and 101, contacts 102 and 103, and wire 99. Said motor M thus now starts a new cycle, and, at the end of five seconds, closes the timer contacts 5 so that current is supplied to said motor regardless of subsequent opening of contacts 102, 103.

The contacts 4 of timer T are opened by motor M at any suitable time. For instance, they may be opened by said motor at the same time that contacts 1 are closed, i. e., ten seconds after the start of the cycle in the present example.

It has been noted that the relays R1 and R2 at the receiving station were energized concurrently with energization of relay R*sy* when the contacts 4′ of the receiver timer T′ are closed. Energization of relay R1 disengages its movable contacts 59 and 67 from contacts 60 and 68, and engages said movable contacts with contacts 113 and 114, respectively, which are connected to the previously mentioned wire 45 and thus to the supply wire 43. Likewise, energization of relay R2 disengages its movable contact 73 from contact 74 and engages said movable contact with contact 115, also connected through wire 45 to supply wire 43.

As previously noted, at the time that the contacts 4' of timer T' are closed (at the end of the cycle of said timer), the contacts 4 of the transmitter timer T are already closed, and current is flowing through wire 94 to the signal line. The relay 61 is thus energized when said transmitter contacts 4 are closed, and thereafter, when relays R1 and R2 are energized, current flows through the receiver relays 31, 31B, and 31C, by way of the respective contacts 63, 70, and 76 of relay 61 and the respective contacts 113, 114, and 115 of said relays R1 and R2. Said relays 31, 31B, and 31C, now energized, establish current flow through the windings of the "increase" clutches of the receivers A, B and C.

The contacts 4' of the receiver timer T' are opened shortly after the start of the cycle (for instance, 8 seconds in the present example), with resultant deenergization of relays R*sy*, R1, and R2. The relays 31, 31B, and 31C of receivers A, B, and C are thus concurrently deenergized, and the windings of the "decrease" clutches are energized.

The aforementioned successive energizations of the "increase" and "decrease" clutch windings in the receivers upon energization and deenergization of the relays R1 and R2 do not affect the readings of the various receivers A, B, and C, since their motors 30, 30B, and 30C are not running, the timer contacts 1', 2', and 3' being open. However, this energization of said clutch windings insures the return of the clutch armatures to zero, against possible residual magnetism effects, so that the clutch mechanisms are ready for the start of the next sequencing period.

It will thus be seen that my invention provides simply and effectively not only for telemetering in predetermined sequence between a plurality of transmitters and receivers of the "impulse-duration" type, but also for insuring that the sequence cycles are properly synchronized at predetermined intervals. Both the signalling and synchronizing operations are, moreover, effected through a signal line employing not more than two wires. In addition, energization of the receiver clutch windings to insure proper positioning of their mechanisms for the start of a new cycle is assured, in conjunction with the synchronizing operation.

It will be apparent that, if desired, the polarized relay PR may be of the well-known type provided with a spring for restoring its armature to an intermediate position whenever current flow therethrough ceases. When said relay PR is of that type, its armature or movable contact 103 is restored to said intermediate position, out of engagement with contact 102 and stop 112, when the contacts 4 of the transmitter timer T are opened (ten seconds after the start of the transmitter timer cycle in the present example).

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a telemetering system, a plurality of transmitters each adapted to send cyclical impulse of given polarity corresponding in duration to values of variable magnitudes, a plurality of receivers each adapted to respond to the impulses from a corresponding one of said transmitters, a signal channel, timing means operable cyclically for connecting said transmitters to said channel in succession for predetermined intervals in each cycle of operation of said timing means, means operated by said timing means for stopping operation thereof at the end of each cycle, other timing means operable continuously through a series of cycles of greater duration than the cycles of the first-mentioned timing means for connecting said receivers to said channel successively for predetermined intervals in each cycle of operation of said other timing means, means comprising a polarized relay connected to said channel for restarting said first-mentioned timing means subsequent to stopping thereof at the end of a cycle, and means controlled by said other timing means for sending over said channel to said polarized relay an impulse of polarity reversed with respect to that of the first-mentioned impulses to effect restarting of said first-mentioned timing means.

2. Telemetric apparatus comprising a plurality of receivers each adapted to respond to cyclical impulses of given polarity and of durations corresponding to values of a variable magnitude, timing means comprising a motor and contacts operated thereby for connecting said receivers successively for predetermined periods to a signal channel for receiving said impulses, other contacts operated by said motor at predetermined intervals, and means controlled by said other contacts for sending a synchronizing impulse of reversed polarity over said channel.

3. Telemetric apparatus comprising a plurality of receivers each comprising a motor and clutches operable thereby in opposite directions, a relay in each receiver responsive to cyclical impulses in a signal channel for energizing one of said clutches for the duration of an impulse in each signaling cycle and for energizing the other of said clutches for the remainder of said cycle, and timing means for setting the received motors in operation successively for predetermined periods and for connecting said receiver relays successively for response to impulses in said channel during said periods.

4. Telemetric apparatus comprising a signal relay responsive to cyclical impulses in a signal channel corresponding to values of a variable, a plurality of receivers each comprising a motor and clutches operable thereby in opposite directions, each of said receivers also having a relay controlled by said signal relay for energizing one of said clutches for the duration of an impulse in each signaling cycle and for energizing the other of said clutches for the remainder of said cycle, and timing means for setting the receiver motors in operation successively for predetermined periods and for connecting said receiver relays for response to impulses received by said signal relay.

5. Telemetric apparatus comprising a signal relay responsive to cyclical impulses in a signal channel corresponding to values of a variable, a plurality of receivers each comprising a motor and clutches operable thereby in opposite directions, each of said receivers also having a relay controlled by said signal relay for energizing one of said clutches for the duration of an impulse in each signaling cycle and for energizing the other of said clutches for the remainder of said cycle, connections between said receiver relays and said signal relay, a timer comprising a motor and contacts operated thereby, and connections between said contacts and the motors and relays of the respective receivers for setting said motors into operation successively for predetermined periods and rendering said receiver relays successively responsive to impulses received by said signal relay.

6. Telemetric apparatus comprising a signal relay responsive to cyclical impulses in a signal channel corresponding to values of a variable, a plurality of receivers each comprising a motor and clutches operable thereby in opposite directions, each of said receivers also having a relay controlled by said signal relay for energizing one of said clutches for the duration of an impulse in each signaling cycle and for energizing the other of said clutches for the remainder of said cycle, connections between said receiver relays and said signal relay, a timer comprising a motor and contacts operated thereby, and connections between said contacts and the motors and relays of the respective receivers for setting said motors into operation successively for predetermined periods and rendering said receiver relays successively responsive to impulses received by said signal relay, other contacts operated by said timer motor at predetermined intervals while said receiver motors are out of action for operating said receiver relays to energize the receiver clutch windings prior to resumption of operation of said receiver motors.

7. Telemetric apparatus comprising a signal relay responsive to cyclical impulses in a signal channel corresponding to values of a variable, a plurality of receivers each comprising a motor and clutches operable thereby in opposite directions, each of said receivers also having a relay controlled by said signal relay for energizing one of said clutches for the duration of an impulse in each signaling cycle and for energizing the other of said clutches for the remainder of said cycle, connections between said receiver relays and said signal relay, a timer comprising a motor and contacts operated thereby, and connections between said contacts and the motors and relays of the respective receivers for setting said motors into operation successively for predetermined periods and rendering said receiver relays successively responsive to impulses received by said signal relay, other contacts operated by said timer motor at predetermined intervals while said receiver motors are out of action, and means controlled by said other contacts for operating the receiver relays to alternately energize and deenergize the receiver clutch windings prior to resumption of operation of said receiver motors.

8. Telemetric apparatus comprising a plurality of receivers each comprising a motor and clutches operable thereby in opposite directions, a relay in each receiver responsive to cyclical impulses in a signal channel for energizing one of said clutches for the duration of an impulse in each signaling cycle for energizing the other of said clutches for the remainder of said cycle, means for setting the receiver motors in operation successively for predetermined periods and for connecting said receiver relays successively for response to impulses in said channel during said periods, and means operable at predetermined intervals while said motors are out of action for energizing said clutches prior to resumption of operation of said motors.

9. Telemetric apparatus comprising a plurality of receivers each comprising a motor and clutches operable thereby in opposite directions, a relay in each receiver responsive to cyclical impulses in a signal channel for energizing one of said clutches for the duration of an impulse in each signaling cycle for energizing the other of said clutches for the remainder of said cycle, means for setting the receiver motors in operation successively for predetermined periods and for connecting said receiver relays successively for response to impulses in said channel during said periods, and means operable at predetermined intervals while said motors are out of action for alternately energizing and deenergizing said clutches prior to resumption of operation of said motors.

10. Telemetric apparatus comprising a plurality of receivers each comprising a motor and clutches operable thereby in opposite directions, a relay in each receiver responsive to cyclical impulses in a signal channel for energizing one of said clutches for the duration of an impulse in each cycle and for energizing the other of said clutches for the remainder of said cycle, timing means for setting the receiver motors in operation successively for predetermined periods and for connecting said receiver relays successively for response to impulses in said channels during said periods, and means operable by said timing means at predetermined intervals while said motors are out of action for energizing said clutches prior to resumption of operation of said motors.

WALTER A. HAGENAU.

REFERENCES CITED

The following references are of record in the file of this patent:

UNITED STATES PATENTS

| Number | Name | Date |
|---|---|---|
| 1,614,222 | White et al. | Jan. 11, 1927 |
| 1,802,643 | Floyd | Apr. 28, 1931 |
| 1,849,827 | FitzGerald | Mar. 14, 1932 |
| 1,945,666 | Stewart | Feb. 6, 1934 |
| 2,061,410 | Stablein | Nov. 17, 1936 |
| 2,111,679 | Thoresen | Mar. 22, 1938 |
| 2,145,026 | Huxford | Jan. 24, 1939 |
| 2,165,892 | Green | July 11, 1939 |
| 2,319,788 | Bryan | May 25, 1943 |
| 2,403,098 | Lear | July 2, 1946 |

FOREIGN PATENTS

| Number | Country | Date |
|---|---|---|
| 514,998 | Germany | Dec. 20, 1930 |